(12) United States Patent
Van Marion et al.

(10) Patent No.: US 6,381,548 B1
(45) Date of Patent: Apr. 30, 2002

(54) METHOD AND DEVICE FOR MEASURING FLUID FLOW

(75) Inventors: Willem Van Marion, Olm (LU); Sebastien Mafrica, Musson (BE); Tom Ritz, Eischen (LU)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/286,239

(22) Filed: Apr. 5, 1999

(30) Foreign Application Priority Data

Apr. 3, 1998 (DE) ......................................... 198 14 972

(51) Int. Cl.$^7$ .............................. G01F 1/00; G01P 5/00
(52) U.S. Cl. ...................... 702/45; 73/118.2; 73/202.2
(58) Field of Search ........................ 702/45, 46; 701/7; 73/861, 118.2, 204.26, 202.5

(56) References Cited

U.S. PATENT DOCUMENTS

| | | | | |
|---|---|---|---|---|
| 4,515,014 A | * | 5/1985 | Sumal ........................ | 73/202.5 |
| 4,527,423 A | * | 7/1985 | Sato et al. .................. | 73/118.2 |
| 5,831,175 A | * | 11/1998 | Fletcher-Haynes ........... | 73/861 |
| 5,918,582 A | * | 7/1999 | Itoyama et al. ......... | 123/568.29 |
| 5,948,975 A | * | 9/1999 | Mueller et al. ............ | 73/118.2 |

* cited by examiner

*Primary Examiner*—Arthur T. Grimley
*Assistant Examiner*—Mohamed Charioui
(74) *Attorney, Agent, or Firm*—Vincent A. Cichosz

(57) ABSTRACT

Method for measuring a fluid flow, in particular an air flow (L), flowing in a flow canal to an engine (VM) or from an engine (VM), by means of a fluid mass measuring means (3) connected to an evaluation means (2), wherein in a regularly performed cycle an operational parameter ($D_1, D_2, \ldots, D_n$) characterizing the operating status of the engine (VM) is recorded, the data ($M_1, M_2, \ldots, M_n$) supplied by the fluid mass measuring means (3) are recorded, at least one extreme value ($E_p, E_n$) is determined from the data ($M_1, M_2, \ldots, M_n$) recorded since the beginning of a time period ($t_1, t_2, \ldots, t_n$), an average value ($W_{ma}$) is determined from the recorded data ($M_1, M_2, \ldots, M_n$), a pulsation amplitude ($P_1, P_2, \ldots, P_m$) is determined by dividing the extreme value ($E_p$) by the average value ($W_{ma}$), and the average value ($W_{ma}$) is corrected by multiplying it by a correction factor ($K_{11}, K_{12}, \ldots, K_{mn}$) which is selected in dependence on the operational parameter ($D_1, D_2, \ldots, D_n$) and the pulsation amplitude ($P_1, P_2, \ldots, P_m$) from a plurality of correction factors ($K_{11}, K_{12}, \ldots, K_{mn}$) stored in a memory (12) of the evaluation means (2) and being determined in an operation test for the type of fluid mass measuring means (3) in relation to the type of engine.

23 Claims, 5 Drawing Sheets

| | $D_1$ | $D_2$ | $D_3$ | ... | $D_a$ | $D_b$ | ... | $D_n$ |
|---|---|---|---|---|---|---|---|---|
| $P_1$ | $K_{11}$ | $K_{12}$ | $K_{13}$ | ... | $K_{1a}$ | $K_{1b}$ | ... | $K_{1n}$ |
| $P_2$ | $K_{21}$ | $K_{22}$ | $K_{23}$ | ... | $K_{2a}$ | $K_{2b}$ | ... | $K_{2n}$ |
| $P_3$ | $K_{31}$ | $K_{32}$ | $K_{33}$ | ... | $K_{3a}$ | $K_{3b}$ | ... | $K_{3n}$ |
| ... | ... | ... | ... | ... | ... | ... | ... | ... |
| $P_a$ | $K_{a1}$ | $K_{a2}$ | $K_{a3}$ | ... | $K_{aa}$ | $K_{ab}$ | ... | $K_{an}$ |
| $P_b$ | $K_{b1}$ | $K_{b2}$ | $K_{b3}$ | ... | $K_{ba}$ | $K_{bb}$ | ... | $K_{bn}$ |
| ... | ... | ... | ... | ... | ... | ... | ... | ... |
| $P_m$ | $K_{m1}$ | $K_{m2}$ | $K_{m3}$ | ... | $K_{ma}$ | $K_{mb}$ | ... | $K_{mn}$ |

Fig. 7.

METHOD AND DEVICE FOR MEASURING FLUID FLOW

TECHNICAL FIELD

The invention concerns a method and a device for measuring a fluid flow, in particular an air flow, flowing in a flow canal to an engine or from an engine, by means of a fluid mass measuring means connected to an evaluation means. Methods and devices of this kind serve for example during operation of an internal combustion engine to measure the air instantaneously drawn in by the engine.

BACKGROUND OF THE INVENTION

Control means which allow optimum possible operation of the engine as a function of the varying requirements of the vehicle driver are used to control modem internal combustion engines, in particular those which are used in motor vehicles. The control means for this purpose record all essential operational parameters of the engine and, depending on the standards of the vehicle driver and taking the properties of the engine into account, transmit control commands to the engine and the associated supply units, which are adapted to the respective operating status. One aim of this so-called "engine management" is to provide optimum performance with low fuel consumption and low emission of noxious substances in every operating situation.

The fuel consumption and emission of noxious substances in an internal combustion engine are essentially determined by the ratio of the air mass and the fuel mass which are drawn in by the engine. Here the air mass flowing to the engine is directly influenced by the vehicle driver who causes adjustment of the choke valve in the air intake. If the choke valve is closed, only a low air mass flows through the intake. With the choke valve fully open, on the other hand, nearly the whole intake cross-section is available for the air flow.

In order to provide a performance which meets the respective requirements of the vehicle driver, a fuel mass corresponding to the air mass flowing to the engine must be supplied to the combustion chamber of the engine which is active at any given time. For this purpose the air mass flowing through the intake is recorded, and the fuel mass which is sufficient for low-exhaust combustion is determined by means of the engine control device. The precision with which the optimum ratio of fuel mass provided for combustion to air mass drawn in is maintained here, depends directly on the exactness with which the air mass flow is measured. It has been established that even minor deviations of the measurement result from the air mass actually supplied lead to a multiplication of the proportion of certain noxious components of the combustion gases. With respect to the legal requirements for the reduction of pollutant emissions, which are getting stricter and stricter, higher and higher demands are therefore being made on the accuracy of measurement of devices with which the air flow in the intake of an internal combustion engine is recorded.

A basic problem in the measurement of a fluid flow which is drawn in by an engine or discharged from it lies in that the curve of the flow is not constant. This is caused inter alia by the fact that as a rule the fluid is not drawn in or conveyed through the engine in a continuous operation. Instead this operation is usually performed in pulsed fashion. As a result, the flow of the fluid is not constant. Added to this is the fact that the resonance properties of the canals through which the fluid flows lead to reverse flows of the fluid.

The flow behaviour of an air stream which is drawn in through an intake common to the combustion chambers of an internal combustion engine is particularly problematic. Since it is not only the combustion chamber which is to be supplied with air and fuel at any given time and which is active with respect to the air intake, but also the other combustion chambers which are connected to this flow canal, due to for example the movement of the inlet valves which control access to the combustion chambers, due to movements of the cylinders in the combustion chambers, due to exhaust gas recirculation, etc. there are pressure pulses which trigger a pulsed air flow in a direction opposite the intake direction. Here the maximum pulsation occurs with maximum choke valve opening or maximum exhaust gas recirculation. The non-uniformity of flow caused inter alia by this disturbance leads for example to considerable impairment of the accuracy of the measurement results in air mass measurement.

Attempts have been made to solve the problems described above in the measurement of a fluid flow by compensating for the pulsation with a corresponding structural arrangement of the measuring sensors. Thus for example a so-called "bidirectional air mass measuring means" in which a temperature sensor is arranged both in front of and behind a heating element in the direction of flow, is known from practical experience for the measurement of an air mass flow drawn in by a motor vehicle internal combustion engine. The heating element is maintained at a constant temperature. If there is no air flow, the same temperature occurs at both temperature sensors. If on the other hand the flow approaches from a certain direction of flow, a temperature difference arises between the sensors. This temperature difference delivers not only information on the mass flow of the air, but also on its direction of flow.

With the fluid mass measuring means described above, of course an improvement in quality of the measurement result can be obtained in comparison with a conventional hot-wire or hot-film air mass measuring means. In practice however it turns out that this improvement is not sufficient to meet the requirements which are getting stricter and stricter.

SUMMARY OF THE INVENTION

It is the object of the invention to provide a method and a device which allow sufficiently precise measurement of a fluid stream flowing through a canal.

With reference to the method, this object is achieved by a method of the kind mentioned hereinbefore, in which in a regularly performed cycle

- an operational parameter characterizing the operating status of the engine is recorded,
- the data supplied by the fluid mass measuring means are recorded,
- at least one extreme value is determined from the data recorded since the beginning of a time period,
- an average value is determined from the recorded data,
- a pulsation amplitude is determined by dividing the extreme value by the average value, and
- the average value is corrected by multiplying it by a correction factor which is selected in dependence on the operational parameter and the pulsation amplitude, from a plurality of correction factors stored in a memory of the evaluation means and being determined in an operation test for the type of fluid mass measuring means in relation to the type of engine.

The invention is based on the concept of reducing the error in the measurement of a mass flow of a fluid by the fact that first an average value is formed from the data recorded within a given time period and then a correction of this average value, which is still subject to error, is made in dependence on certain parameters which characterize the respective operating status of the engine, the properties of the air mass measuring means and the behaviour of the measured fluid flow during the measuring period. The average value corrected in this way is available as the result of fluid mass flow measurement for further processing. In this way the method according to the invention delivers, without elaborate structural alterations to the flow canal, the fluid mass measuring means, the evaluation means or other components which influence the measurement, a measurement result which can be used for example for control of an engine and which lies within the required narrow error tolerance limits.

To prepare for the correction of the previously determined average value, with the method according to the invention an extreme value is recorded. This extreme value is standardised by means of the average value. In this way, according to the invention a quantity referred to as the "pulsation amplitude" is available, which makes a statement about the behaviour of the fluid flow during recording of the data, particularly about the periodically occurring fluctuations in the speed and direction of flow of the fluid flow. Calculation of the pulsation amplitude furthermore allows, taking the also recorded engine parameter into account, a prediction of the error which the fluid mass measuring means typically delivers with the operating status of the engine concerned and with the behaviour of the fluid flow concerned.

Surprisingly it turned out that on the basis of the pulsation amplitude a correction of the average values can be made reliably even when the external conditions such as ambient temperature and pressure and air humidity vary, owing to which the flow and pulsation behaviour of the fluid is varied.

The measurement behaviour which is typical of the fluid mass measuring means used at any given time in connection with the engine used at any given time is determined according to the invention in an operation test in which a prototype of the fluid mass measuring means is tested in connection with a prototype of the engine. Both the prototype of the fluid mass measuring means and the prototype of the engine are in this case representative of the fluid mass measuring means and engine models used in series.

In the course of the operation test, the correction factors are determined with which the measurement result which is assigned in each case to a given engine parameter and a given pulsation amplitude and which is subject to error can be typically corrected in such a way that it is within the permitted tolerance. It has been established that the measurement behaviour determined in this way for the fluid mass measuring means model in connection with the engine model and the correspondingly determined correction factors apply to all other fluid mass measuring means of this model which are used on engines of the engine model concerned. This is true even when changes are made to the flow canal, it being obvious that the effectiveness of the correction made with the aid of the correction factors is checked before final use of the altered flow canal. The invention thus makes it possible to appreciably shorten the time needed for development of the air path or adjustment of engine management of for example an internal combustion engine. Unlike known methods for determining the air mass flow, it is now no longer necessary to readjust the measuring device as such to every change in parameters of engine management or of the flow canal.

The correction factors obtained in the operation test are stored in a memory of the evaluation means, a given correction factor being accessed in each case as a function of the pulsation amplitude respectively assigned to it and the engine parameter respectively assigned to it. A change of the correction factors stored in this way during use of the engine is as a rule not provided for. It is however also possible within the scope of the invention to make a change to the correction data in the sense of a self-learning system when it is established by suitable check instances that the correction made at any given time to an average value is not sufficient.

Basically any time period within which a number of data sufficient for reliable averaging can be recorded, can be selected as the time period. In those cases in which the engine exhibits periodically repeated operation sequences, it is however favourable to relate the time period to the time within which the engine passes through the period concerned. In the case of internal combustion engines, in this connection for example it proved advantageous if the time period corresponds to a fraction, particularly half, of the time needed for one crankshaft revolution.

In particular when the engine is an internal combustion engine which is moreover preferably used to drive a motor vehicle, it is also advantageous if the speed and/or the angle position of the crankshaft of the engine is recorded as the operational parameter.

Digitalized processing of the data can be made easier by the fact that the data supplied by the fluid mass measuring means are recorded in a cycle-controlled manner. Preferably the cycle-controlled recording is carried out in this case with a sampling frequency of at least 1 kHz.

In particular with cycle-controlled recording of the data it is favourable if always one measured value is recorded at the end of each time period. In this way it is ensured that the measuring point at the end of the time period, which is in many cases important for averaging, is recorded even when the length of the time period does not correspond to an integral multiple of the cycle time.

Basically any suitable numerical method can be employed to determine the average value of the data of a measuring period. With respect to practical implementation of the method according to the invention, in this connection it proved favourable if the average value is the trapezoidal average of the measured data.

The extreme value used to determine the pulsation amplitude is determined as a function of the characteristic curve of the respective system formed from engine, flow canal and fluid mass measuring means. If for example positive or negative data deviations are predominant in such a system, it may be advantageous if the extreme value corresponds to the greatest positive or negative deviation of the measured data from the average value. In other cases in which for example there is a relatively balanced distribution of deviations between positive and negative, it may be advantageous to record the positive and negative extreme values of the measured data and for the calculation of the pulsation amplitude to divide the average of the amounts of both these extreme values by the average value of the measured data.

The method according to the invention can be employed particularly advantageously in the measurement of an air flow drawn in by a motor vehicle internal combustion engine. The corrected data made available for engine management by the evaluation means fulfil even the strictest requirements of the automobile industry. This applies particularly when the air mass flow drawn in by the engine is measured by the method according to the invention.

With respect to the device, the object stated above is achieved by a device for measuring a fluid flow, in particular an air flow, flowing in a flow canal to an engine or from an engine, said device having an evaluation means and a fluid mass measuring means connected to the evaluation means, which is characterized in that the evaluation means comprises a data recording means recording the measured values supplied by the fluid mass measuring means, a means for recording an operational parameter of the engine, a timer signalling the beginning and the end of a measuring period, a memory storing the data supplied by the fluid mass measuring means, a memory in which correction factors are stored in such a way as to permit access to a particular factor of these correction factors depending on the respective operational parameter and on a respective pulsation amplitude, and a calculating unit, which calculating unit determines an extreme value from the data recorded during a time period, determines an average value from the data and files it in a memory, determines a pulsation amplitude by dividing the extreme value by the average value, and corrects the determined average value by multiplying it by the correction factor which is read out of the memory depending on the respective operational parameter and the respective pulsation amplitude.

Preferably with the device according to the invention a bidirectional fluid mass measuring means arranged in the flow canal in which a temperature sensor is arranged both in front of and behind a heating means in the direction of flow is used as the fluid mass measuring means. A fluid mass measuring means of this kind is as a rule used to measure the air flow drawn in by an engine, particularly an internal combustion engine. On account of its special design with short response times it delivers measurement results which are subject to a relatively minor measurement error. This measurement error too, however, increases as a function of the pulsation amplitude.

A particularly advantageous design of the device according to the invention is characterized in that the fluid mass measuring means and the evaluation means form a constructional unit. This makes it possible for a supply firm, particularly in case of mass production such as is the rule in automobile construction, to provide the further processing firm with a ready-made constructional unit which at an interface provides a reliable measurement signal to be further processed without problems. Also in this variant the evaluation means can be adjusted specifically for the application in production.

According to another variant of the device according to the invention which is also advantageous, depending on the application, the evaluation means is part of a controlling apparatus used to control the respective engine.

BRIEF DESCRIPTION OF THE DRAWINGS

The present invention will now be described, by way of example, with reference to the accompanying drawings, in which:

FIG. 7 the storage schema whereby the correction factors are stored in the memory of an evaluation means which processes the measurement results of the bidirectional fluid mass measuring means.

DESCRIPTION OF THE PREFERRED EMBODIMENT

Figure 1:
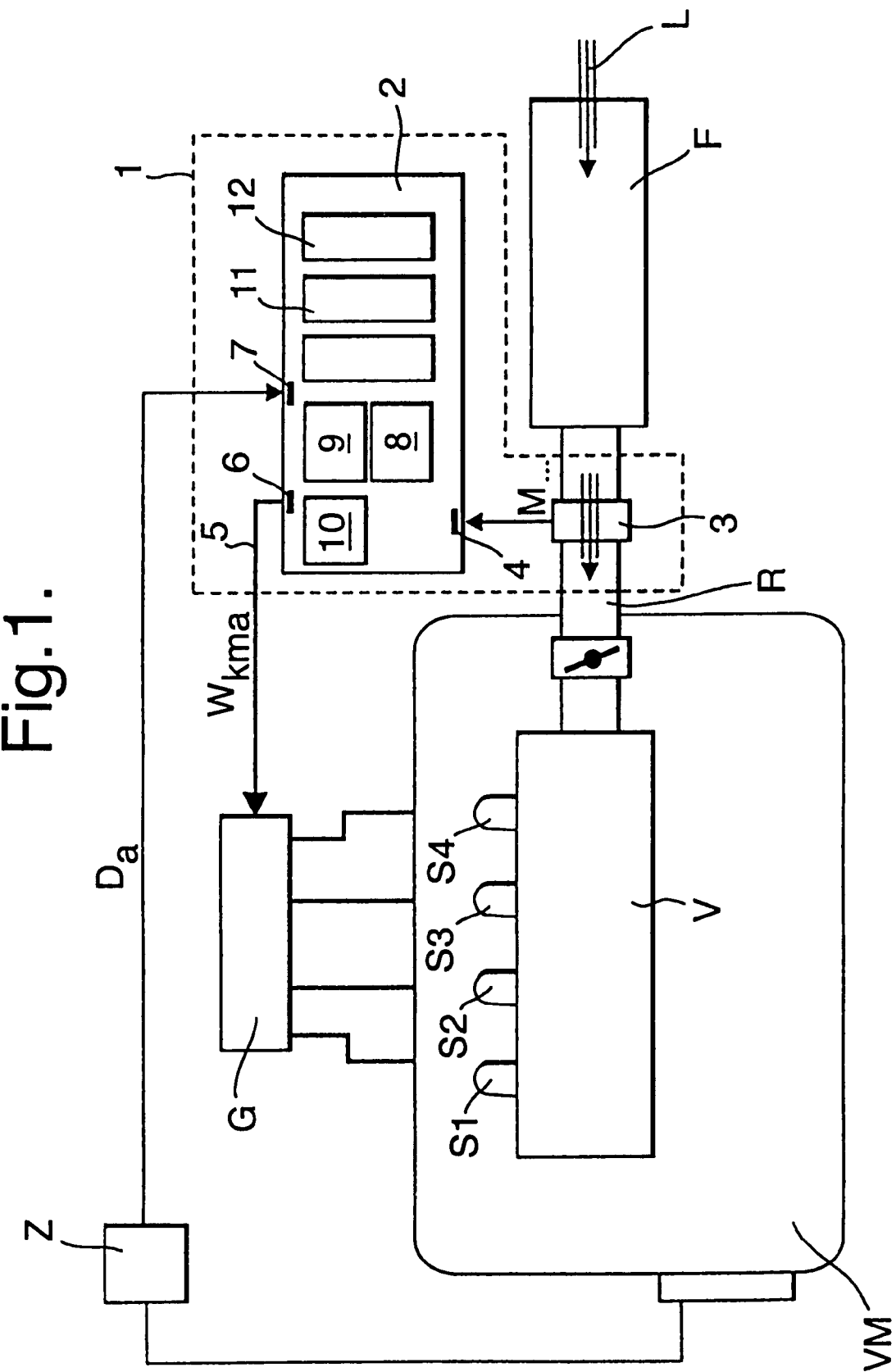
FIG. 1 is a device used on an internal combustion engine for measuring the air mass flow drawn in by the internal combustion engine, in a schematic view.
Figure 2:
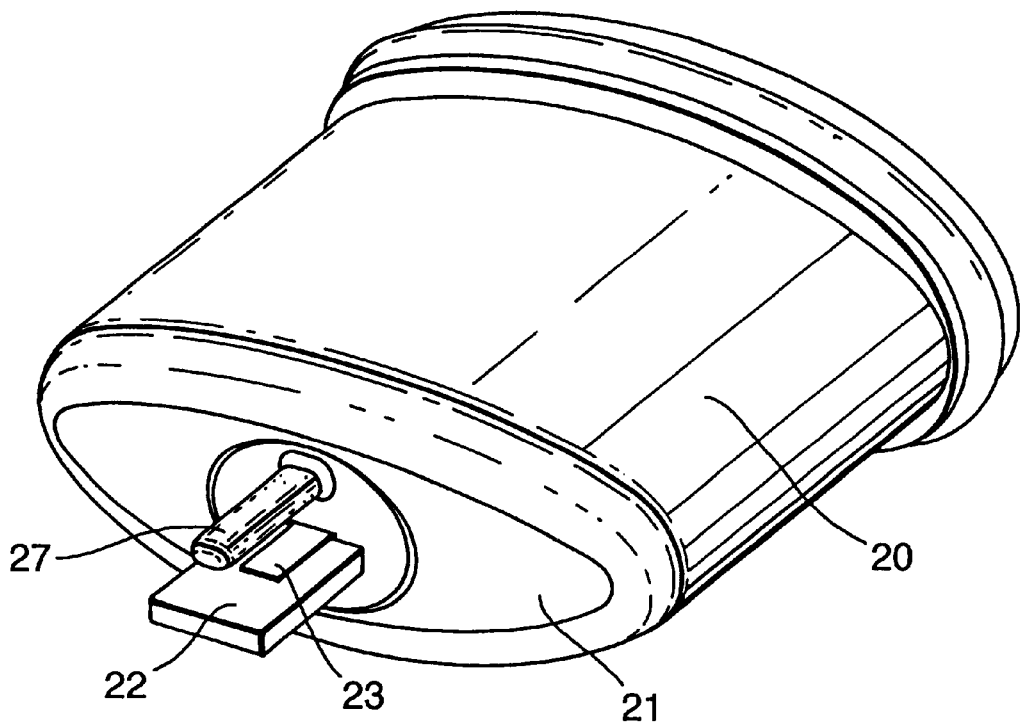
FIG. 2 a bidirectional air mass measuring means in a perspective view.
Figure 3:
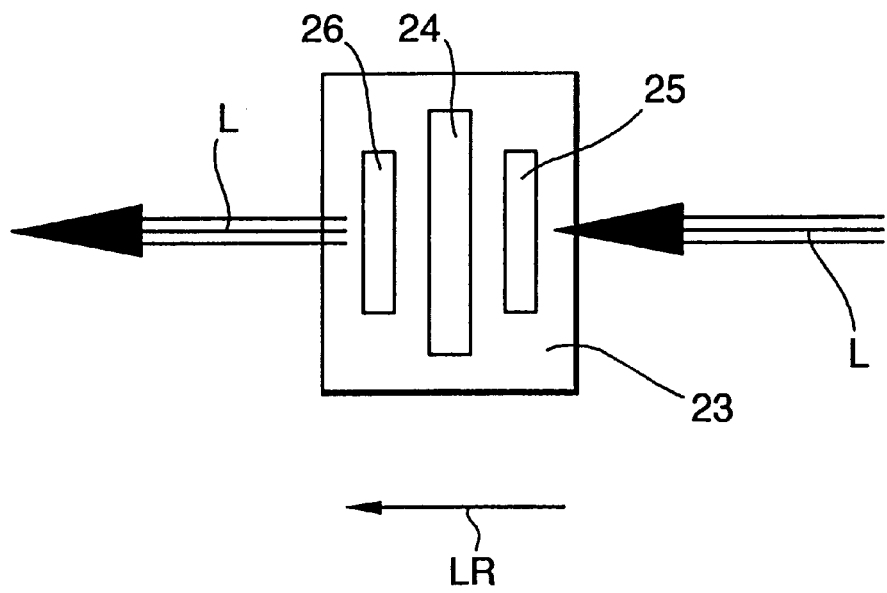
FIG. 3 the sensor of the air mass measuring means in an enlarged view.

The device 1 for measuring the air mass flow L drawn in by an internal combustion engine VM comprises an evaluation means 2 and an air mass measuring means 3 which is constructed as a bidirectional air mass measuring means and connected to the first signal input 4 of the evaluation means 2. The air mass measuring means 3 is positioned in the region of the input of a distributor chamber V on a connecting pipe R by which the distributing chamber V is connected to an air filter F. In addition the intakes S1, S2, S3, S4 of the combustion chambers of the engine VM are connected to the distributor chamber V. The air filter F, the connecting pipe R and the distributor chamber V form the flow canal through which the internal combustion engine VM draws the air mass flow L. Operation of the internal combustion engine M, particularly the quantity of fuel injected into the combustion chambers of the engine, is controlled by an injection control device G which is connected by a signal wire 5 to the output 6 of the evaluation means 2. The control unit G and the evaluation means 2 can together form part of an engine controlling apparatus, not shown further.

At a second signal input 7 of the evaluation means 2 is the signal of a speed measuring means Z by which the speed and the angle position of the crankshaft of the internal combustion engine VM are available to the evaluation means 3. Apart from other elements not described here, which are usually needed for the operation of such devices, the evaluation means 2 is equipped with a data recording means 8, a calculating unit 9, a timer 10, a first memory 11 and a second memory 12.

The timer 10 of the evaluation means 2 indicates as a function of the crankshaft angle position the beginning $t_a$ and the end $t_e$ of successive time periods $t_1, t_2, \ldots, t_n$ within which the data $M_1, M_2, \ldots, M_n$ supplied by the air mass measuring means 3 are recorded cyclically by the data recording means 8. The data $M_1, M_2, \ldots, M_n$ recorded in this way are temporarily stored in the first memory 11 of the evaluation means 2. The length of the time periods $t_1, t_2, \ldots, t_n$ indicated by the timer 10 here corresponds in each case to the length of time which the crankshaft of the internal combustion engine VM needs for half a revolution. In addition the data recording means 8 records the respective speed $D_1, D_2, \ldots, D_n$ of the internal combustion engine VM in the respective time period $t_1, t_2, \ldots, t_n$.

In the second memory 12 of the evaluation means 2 are stored correction factors $K_{11}, K_{12}, \ldots, K_{mn}$ (n, m from the quantity of natural numbers) according to the schema shown in FIG. 7. Here each correction factor $K_{11}, K_{12}, \ldots, K_{mn}$ is assigned a given speed $D_1, D_2, \ldots, D_n$ and a given pulsation amplitude $P_1, P_2, \ldots, P_m$. In this way the calculating unit 9 can, after a given speed $D_1, D_2, \ldots, D_n$ has been detected and after it has been determined a given pulsation amplitude $P_1, P_2, \ldots, P_m$, directly access the respectively associated correction factor $K_{11}, K_{12}, \ldots, K_{mn}$. If for example the speed $D_3$ occurs in the time period $t_1$ and if at the same time the pulsation amplitude $P_2$ has been determined, the calculating unit accesses the correction factor $K_{23}$. The latter is then, as described in detail below, multiplied by the average value $W_{ma}$ of the data $M_1, M_2, \ldots, M_n$ recorded in the time period $t_1$ in order to provide the injection control device G with a corrected average value $W_{kma}$.

The air mass measuring means 3 comprises a housing 20 to whose end wall 21, which extends into the connecting pipe R, is attached a ceramic support 22 protruding perpendicularly from the end wall 21 into the connecting pipe R. The ceramic support 22 carries a sensor 23 which is formed from a heating element 24 extending essentially transversely to the direction of flow LR of the air mass flow L, and temperature sensors 25, 26 extending with parallel axis and at a distance from the heating element 24 in front of and behind the heating element 24 in the direction of flow LR. Above the ceramic support 23 a pin-like projection 27 is formed integrally with the end wall 21.

Figure 6:
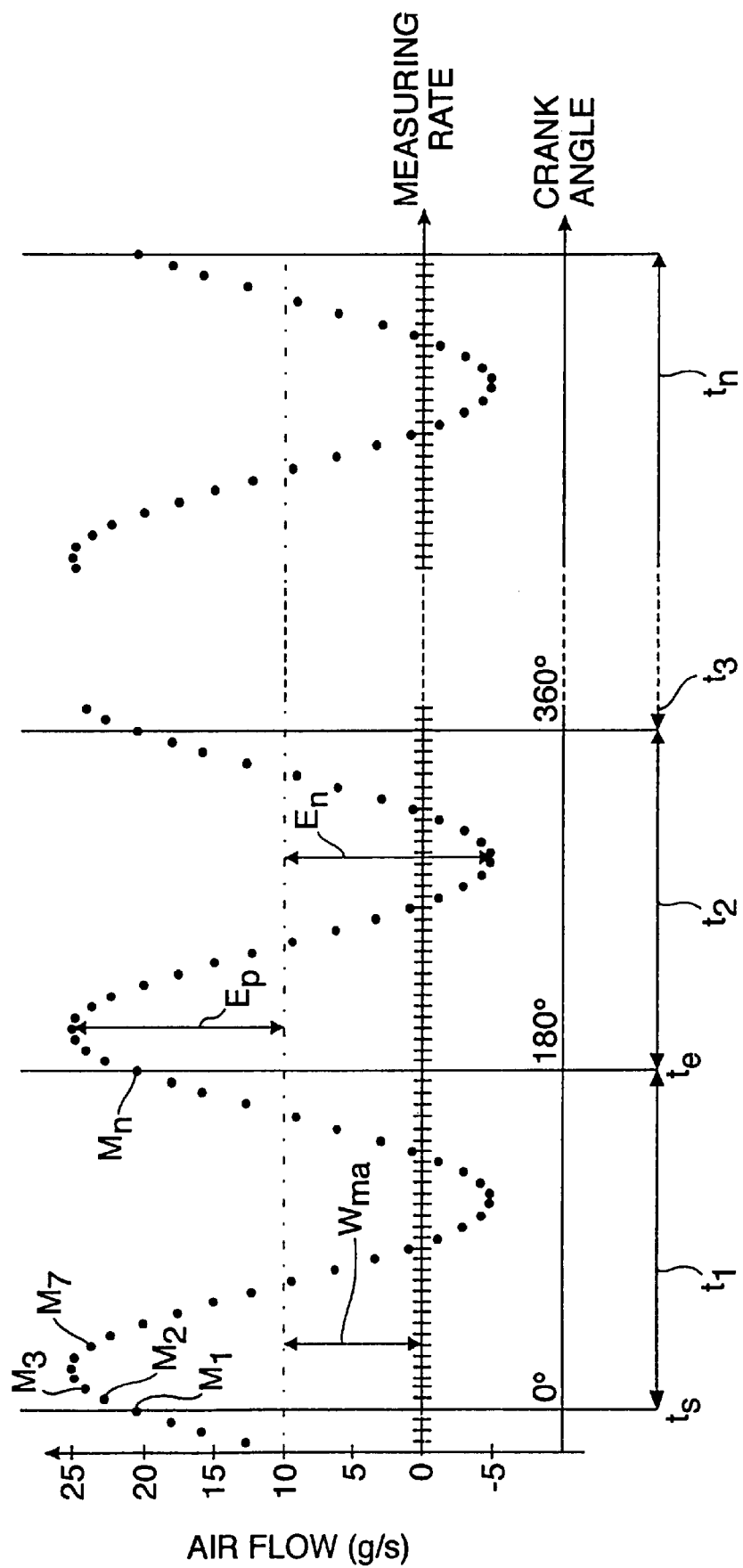
FIG. 6 the curve of the data supplied by the bidirectional fluid mass measuring means, plotted against the recording cycles.

As soon as the timer 10 has indicated the beginning $t_a$ of a time period $t_1, t_2, \ldots, t_n$ as a function of the crankshaft angle position (FIG. 6), the data $M_1, M_2, \ldots, M_n$ supplied by the air mass measuring means 3 are recorded cyclically at a sampling frequency of 1 kHz by the evaluation means 2 and filed in the first memory 11. At the same time the positive extreme value $E_p$ and as the operational parameter the instantaneous speed $D_a$ are recorded.

According to a first variant of the invention the data $M_1, M_2, \ldots, M_n$ are stored in the first memory 11 at least for the duration of the respective time period $t_1, t_2, \ldots, t_n$. The calculating unit 9 in this case after the end of the respective time period $t_1, t_2, \ldots, t_n$ determines an average value $W_{ma}$ from the data $M_1, M_2, \ldots, M_n$.

Alternatively it is possible that the calculating unit 9 forms an (intermediate) average value already during recording of the data $M_1, M_2, \ldots, M_n$ on the basis of the data $M_1, M_2, \ldots, M_n$ currently being recorded at the time, and files it in the memory 11. This average value is updated with every newly recorded data $M_1, M_2, \ldots, M_n$, so that at the end of the respective time period $t_1, t_2, \ldots, t_n$ it corresponds to the desired average value $W_{ma}$ of all data $M_1, M_2, \ldots, M_n$ recorded during this time period $t_1, t_2, \ldots, t_n$. In this variant it is only necessary in each case to store in the first memory 11 the (intermediate) average value and for example the number of recorded measuring points or the last but one measuring point for averaging. The memory 11 can in this case be very much smaller than in the first variant.

Next the pulsation amplitude $P_b$ is determined by dividing the positive extreme value $E_p$ by the determined average value $W_{ma}$. Then the correction factor $K_{ba}$ corresponding to the speed $D_a$ and the pulsation value $P_b$ is read out of the memory 12 of the evaluation means 3 and multiplied by the average value $W_{ma}$. The correspondingly corrected average value $W_{kma}$ is made available to the control device G or the engine controlling apparatus, not shown, for further processing.

The method sequence described above is repeated as long as the internal combustion engine is running.

Figure 4:
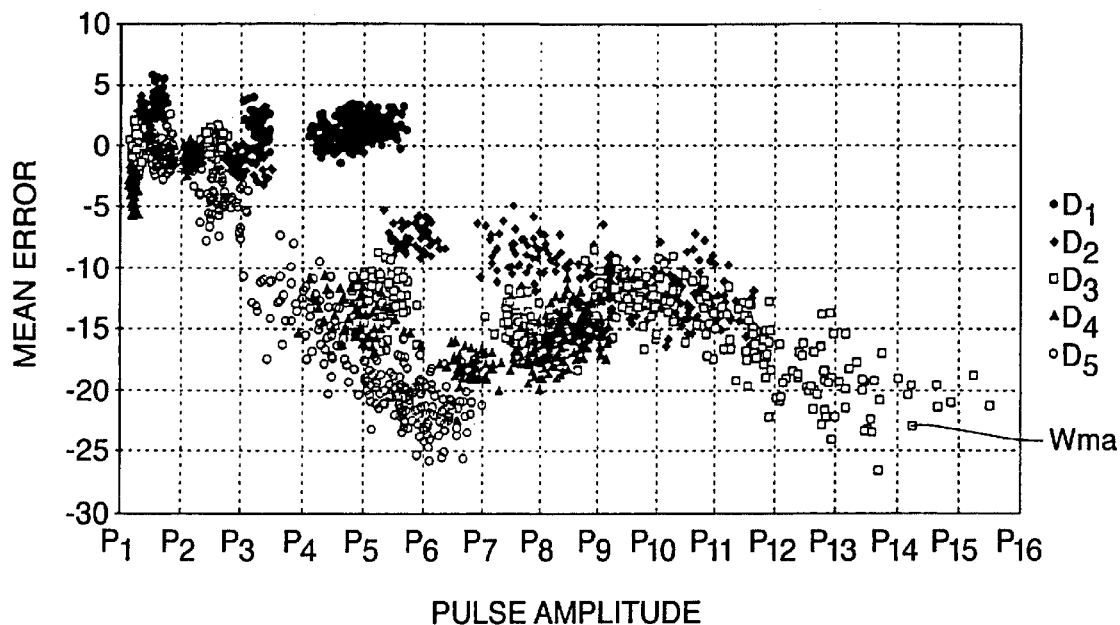
FIG. 4 errors of the average value plotted against the pulsation amplitude before error correction at certain operating points.

In FIG. 4 are shown by way of example for plurality of pulsation amplitudes $P_1, P_2, \ldots, P_n$ the errors of the associated uncorrected average values, which have been determined from the data recorded by the air mass measuring means 3 at given speeds $D_1, D_2, D_3, D_4, D_5$. It is clear that with this type of air mass measuring means in connection with the engine model at given speeds typically errors of more than 25% occur, the commonest deviations being between −10% and −20%. It is noteworthy that the error in by far the most cases increases with increasing pulsation amplitude $P_1 \ldots P_{16}$.

Figure 5:
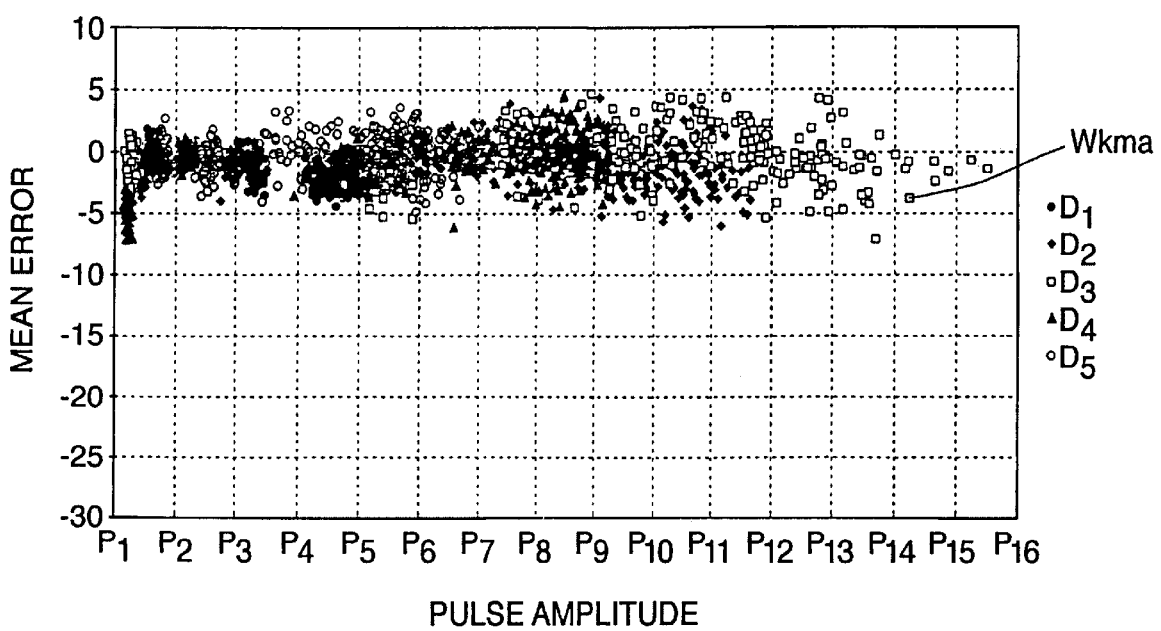
FIG. 5 the errors of the average value plotted against the pulsation amplitude and shown in FIG. 4, after error correction for the operating points indicated in FIG. 4.

In FIG. 5 are plotted the corrected average values according to the representation in FIG. 4. It can be seen that by far the majority of the deviations of data corrected by the correction factors $K_{11}, K_{12}, \ldots, K_{mn}$ from the reference value of air mass L are within a range of +/−5%. They therefore meet even the strictest requirements.

The correction factors $K_{11}, K_{12}, \ldots, K_{mn}$ have been determined in an operation test, testing the measurement behaviour of an air mass measuring means which belongs to the type of air mass measuring means 2 used in each case and which has been operated in connection with an internal combustion engine belonging to the type of internal combustion engine VM used in each case. In this operation test, at a plurality of speeds specified each time, the actual air mass (reference air mass value) which was drawn in by the internal combustion engine was determined by a reference air mass measuring means which was unaffected in its range by the disturbances of air flow due to a corresponding design of the flow canal. At the same time the measurement results of the air mass measuring means whose position corresponds to the position of the air mass measuring means in practical use were recorded. An average value was then formed from the data recorded in this way within a time period at a given speed. This average value was compared with the reference air mass value measured by the reference air mass measuring means. The result of this comparison supplied the correction factor multiplied by which the data subject to error can be harmonised with the reference air mass value. Finally according to the procedure described above an associated pulsation amplitude was determined from the data of the air mass measuring means in order to allow assignment of the respective correction factor to the respective operating status of the internal combustion engine (speed) and the respective status of the air flow (pulsation amplitude).

Due to the type of correction according to the invention in dependence on the pulsation amplitude, there is independence of resonance variations in the intake pipe, which are dependent on the ambient status such as the temperature, the pressure or the air humidity.

What is claimed is:

1. Method for measuring a fluid flow, in particular an air flow (L), flowing in a flow canal to an engine (VM) or from an engine (VM), by means of a fluid mass measuring means (3) connected to an evaluation means (2), wherein in a regularly performed cycle an operational parameter $(D_1, D_2, \ldots, D_n)$ characterizing the operating status of the engine (VM) is recorded, the data $(M_1, M_2, \ldots, M_n)$ supplied by the fluid mass measuring means (3) are recorded, at least one extreme value $(E_p, E_n)$ is determined from the data $(M_1, M_2, \ldots, M_n)$ recorded since the beginning of a time period $(t_1, t_2, \ldots, t_n)$, an average value $(W_{ma})$ is determined from the recorded data $(M_1, M_2, \ldots, M_n)$, a pulsation amplitude $(P_1, P_2, \ldots, P_m)$ is determined by dividing the extreme value $(E_p)$ by the average value $(W_{ma})$, and the average value $(W_{ma})$ is corrected by multiplying it by a correction factor $(K_{11}, K_{12}, \ldots, K_{mn})$ which is selected in dependence on the operational parameter ($D_1$, $D_2$, ..., $D_n$) and the pulsation amplitude ($P_1$, $P_2$, ..., $P_m$) from a plurality of correction factors ($K_{11}$, $K_{12}$, ..., $K_{mn}$) stored in a memory (12) of the evaluation means (2) and being determined in an operation test for the type of fluid mass measuring means (3) in relation to the type of engine.

2. Method according to claim 1, characterized in that the time period ($t_1$, $t_2$, ..., $t_n$) corresponds to a fraction of the time which the engine (VM) needs for passing through a periodically repeated operation sequence.

3. Method according to any one of the preceding claims, characterized in that the speed ($D_1$, $D_2$, ..., $D_n$) and/or the angle position of the crankshaft of the engine (VM) is recorded as the operational parameter.

4. Method according to claim 1, characterized in that the data ($M_1$, $M_2$, ..., $M_n$) supplied by the fluid mass measuring means (3) are recorded in a cycle-controlled manner and characterized in that the cycle-controlled recording is carried out with a sampling frequency of at least 1 kHz.

5. Method according to claim 1, characterized in that always one measured value is recorded at the end of each time period ($t_1$, $t_2$, ..., $t_n$).

6. Method according to claim 1, characterized in that the extreme value corresponds to the greatest positive deviation ($E_p$) of the measured data ($M_1$, $M_2$, ..., $M_n$) from the average value ($W_{ma}$), and in that for the calculation of the pulsation amplitude the extreme value ($E_p$) is divided by the average value ($W_{ma}$) of the measured data ($M_1$, $M_2$, ..., $M_n$).

7. Method according to claim 1, characterized in that the positive and negative extreme values ($E_p$, $E_n$) of the measured data ($M_1$, $M_2$, ..., $M_n$) are recorded, and in that for the calculation of the pulsation amplitude the average of the amounts of both these extreme values ($E_p$, $E_n$) is divided by the average value ($W_{ma}$) of the measured data ($M_1$, $M_2$, ..., $M_n$).

8. Method according to claim 1, characterized in that the average value ($W_{ma}$) is the trapezoidal average of the measured data ($M_1$, $M_2$, ..., $M_n$).

9. Method according to claims 1, 2, 4, 6, 7, or 8, characterized in that the engine is the internal combustion engine (VM) of a vehicle.

10. Method according to claim 2, characterized in that the data ($M_1$, $M_2$, ..., $M_n$) supplied by the fluid mass measuring means (3) are recorded in a cycle-controlled manner characterized in that the cycle-controlled recording is carried out with a sampling frequency of at least 1 kHz.

11. Method according to claims 2 or 4, characterized in that always one measured value is recorded at the end of each time period ($t_1$, $t_2$, ..., $t_n$).

12. Method according to claims 2, 4 or 5, characterized in that the extreme value corresponds to the greatest positive deviation ($E_p$) of the measured data ($M_1$, $M_2$, ..., $M_n$) from the average value ($W_{ma}$), and in that for the calculation of the pulsation amplitude the extreme value ($E_p$) is divided by the average value ($W_{ma}$) of the measured data ($M_1$, $M_2$, ..., $M_n$).

13. Method according to claims 2, 4 or 6, characterized in that the positive and negative extreme values ($E_p$, $E_n$) of the measured data ($M_1$, $M_2$, ..., $M_n$) are recorded, and in that for the calculation of the pulsation amplitude the average of the amounts of both these extreme values ($E_p$, $E_n$) is divided by the average value ($W_{ma}$) of the measured data ($M_1$, $M_2$, ..., $M_n$).

14. Method according to claim 3, characterized in that the engine is the internal combustion engine (VM) of a vehicle.

15. Method according to claim 3, characterized in that the data ($M_1$, $M_2$, ..., $M_n$) supplied by the fluid mass measuring means (3) are recorded in a cycle-controlled manner characterized in that the cycle-controlled recording is carried out with a sampling frequency of at least 1 kHz.

16. Method according to claim 3, characterized in that always one measured value is recorded at the end of each time period ($t_1$, $t_2$, ..., $t_n$).

17. Method according to claim 3, characterized in that the extreme value corresponds to the greatest positive deviation ($E_p$) of the measured data ($M_1$, $M_2$, ..., $M_n$) from the average value ($W_{ma}$), and in that for the calculation of the pulsation amplitude the extreme value ($E_p$) is divided by the average value ($W_{ma}$) of the measured data ($M_1$, $M_2$, ..., $M_n$).

18. Method according to claim 3, characterized in that the positive and negative extreme values ($E_p$, $E_n$) of the measured data ($M_1$, $M_2$, ..., $M_n$) are recorded, and in that for the calculation of the pulsation amplitude the average of the amounts of both these extreme values ($E_p$, $E_n$) is divided by the average value ($W_{mg}$) of the measured data ($M_1$, $M_2$, ..., $M_n$).

19. Method according to claim 3, characterized in that the average value ($W_{ma}$) is the trapezoidal average of the measured data ($M_1$, $M_2$, ..., $M_n$).

20. Method according to claims 2, 4, 6, 7 or 8, characterized in that the average value ($W_{ma}$) is the trapezoidal average of the measured data ($M_1$, $M_2$, ..., $M_n$).

21. Device for measuring a fluid flow, in particular an air flow (L), flowing in a flow canal to an engine (VM) or from an engine (VM), said device having an evaluation means (2) and a fluid mass measuring means (3) connected to the evaluation means (2), characterized in that the evaluation means (2) comprises a data recording means (1) recording the measured values ($M_1$, $M_2$, ..., $M_n$) supplied by the fluid mass measuring means (3), a means for recording an operational parameter ($D_1$, $D_2$, ..., $D_n$) of the engine (VM), a timer (10) signalling the beginning ($t_a$) and the end ($t_e$) of a measuring period ($t_1$, $t_2$, ..., $t_n$), a memory (11) storing the data ($M_1$, $M_2$, ..., $M_n$) supplied by the fluid mass measuring means (3), a memory (12) in which correction factors ($K_{11}$, $K_{12}$, ..., $K_{mn}$) are stored in such a way as to permit access to a particular factor ($K_{ba}$) of these correction factors ($K_{11}$, $K_{12}$, ..., $K_{mn}$) depending on the respective operational parameter ($D_a$) and on a respective pulsation amplitude ($P_b$), and a calculating unit (9), which calculating unit determines an extreme value ($E_p$, $E_n$) from the data ($M_1$, $M_2$, ..., $M_n$) recorded during a time period ($t_1$, $t_2$, ..., $t_n$) and files it in another memory, determines an average value ($W_{ma}$) from the data ($M_1$, $M_2$, ..., $M_n$) and files it in a memory, determines a pulsation amplitude ($P_1$, $P_2$, ..., $P_m$) by dividing the extreme value ($E_p$) by the average value ($W_{ma}$), and corrects the determined average value ($W_{ma}$) by multiplying it by the correction factor ($K_{ba}$) which is read out of the memory (12) depending on the respective operational parameter ($D_a$) and the respective pulsation amplitude ($P_b$).

22. Device according to claim 21, characterized in that the fluid mass measuring means (3) and the evaluation means (2) form a constructional unit.

23. Device according to claim 21, characterized in that the evaluation means (2) is part of an engine controlling apparatus controlling the respective operating mode of the engine.

* * * * *